(12) United States Patent
Yanik et al.

(10) Patent No.: US 7,757,753 B2
(45) Date of Patent: Jul. 20, 2010

(54) MULTICHANNEL HEAT EXCHANGER WITH DISSIMILAR MULTICHANNEL TUBES

(75) Inventors: Mustafa K. Yanik, York, PA (US); Jeffrey Lee Tucker, Wichita, KS (US); Mahesh Valiya-Naduvath, Lutherville, MD (US); Dan R. Burdette, Wichita, KS (US); Charles B. Obosu, Wichita, KS (US); Jeffrey N. Nichols, Wichita, KS (US); William L. Kopko, Jacobus, PA (US); Jose Ruel Yalung de la Cruz, Dover, PA (US); Kevin E. Keller, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/040,612

(22) Filed: Feb. 29, 2008

(65) Prior Publication Data
US 2008/0142203 A1 Jun. 19, 2008

Related U.S. Application Data

(63) Continuation of application No. PCT/US2007/085262, filed on Nov. 20, 2007.

(60) Provisional application No. 60/909,598, filed on Apr. 2, 2007, provisional application No. 60/882,033, filed on Dec. 27, 2006, provisional application No. 60/867,043, filed on Nov. 22, 2006.

(51) Int. Cl.
*F28F 9/02* (2006.01)
*F28D 7/06* (2006.01)

(52) U.S. Cl. .................. 165/174; 165/176

(58) Field of Classification Search ............. 165/140, 165/146, 174, 175, 176, 178; 62/507, 509
See application file for complete search history.

(56) References Cited

U.S. PATENT DOCUMENTS

| 3,229,722 A | 1/1966 | Kritzer |
| 3,603,384 A | 9/1971 | Huggins et al. |
| 3,636,982 A | 1/1972 | Drake |

(Continued)

FOREIGN PATENT DOCUMENTS

DE 19740114 3/1999

(Continued)

OTHER PUBLICATIONS

U.S. Appl. No. 12/040,501, filed Feb. 29, 2008, Tucker et al.

(Continued)

*Primary Examiner*—Tho v Duong
(74) *Attorney, Agent, or Firm*—Fletcher Yoder

(57) ABSTRACT

Heating, ventilation, air conditioning, and refrigeration (HVAC&R) systems and heat exchangers are provided which include dissimilar internal configurations. The heat exchangers include multiple sets of multichannel tubes in fluid communication with each other. One set of multichannel tubes contains flow channels of one shape and size while the another set of multichannel tubes contains flow channels of a different shape and/or size. The dissimilar flow channels within the multichannel tube sets allow each set of tubes to be configured to the properties of the refrigerant flowing within the tubes.

22 Claims, 5 Drawing Sheets

U.S. PATENT DOCUMENTS

| | | | |
|---|---|---|---|
| 3,871,407 A | 3/1975 | Bykov et al. | |
| 4,031,602 A | 6/1977 | Cunningham et al. | |
| 4,190,105 A | 2/1980 | Dankowski | |
| 4,370,868 A | 2/1983 | Kim | |
| 4,766,953 A | 8/1988 | Grieb et al. | |
| 4,972,683 A * | 11/1990 | Beatenbough | 62/507 |
| 5,101,890 A * | 4/1992 | Aoki et al. | 165/152 |
| 5,168,925 A | 12/1992 | Suzumura | |
| 5,186,248 A | 2/1993 | Halstead | |
| 5,251,682 A | 10/1993 | Haussmann | |
| 5,327,959 A | 7/1994 | Saperstein | |
| 5,372,188 A | 12/1994 | Dudley | |
| 5,448,899 A | 9/1995 | Ohara | |
| 5,479,784 A | 1/1996 | Dobmeier | |
| 5,586,598 A | 12/1996 | Tanaka et al. | |
| 5,765,393 A * | 6/1998 | Shlak et al. | 62/507 |
| 5,768,902 A * | 6/1998 | Nonaka et al. | 62/183 |
| 5,797,184 A | 8/1998 | Tanaka et al. | |
| 5,826,646 A | 10/1998 | Bae | |
| 5,836,382 A | 11/1998 | Dingle | |
| 5,901,782 A | 5/1999 | Voss | |
| 5,901,785 A | 5/1999 | Chiba | |
| 5,910,167 A | 6/1999 | Reinke | |
| 5,934,367 A | 8/1999 | Shimmura | |
| 5,941,303 A | 8/1999 | Gowan et al. | |
| 5,967,228 A | 10/1999 | Bergman | |
| 6,148,635 A | 11/2000 | Beebe | |
| 6,155,075 A | 12/2000 | Hanson | |
| 6,199,401 B1 | 3/2001 | Haussmann | |
| 6,250,103 B1 * | 6/2001 | Watanabe et al. | 62/509 |
| 6,289,980 B1 * | 9/2001 | Insalaco et al. | 165/174 |
| 6,394,176 B1 * | 5/2002 | Marsais | 165/140 |
| 6,449,979 B1 | 9/2002 | Nagasawa | |
| 6,502,413 B2 | 1/2003 | Repice | |
| 6,688,137 B1 | 2/2004 | Gupte | |
| 6,745,827 B2 * | 6/2004 | Lee et al. | 165/144 |
| 6,814,136 B2 | 11/2004 | Yi | |
| 6,827,128 B2 | 12/2004 | Philpott | |
| 6,868,696 B2 | 3/2005 | Ikuta | |
| 6,886,349 B1 | 5/2005 | Curicuta | |
| 6,892,802 B2 | 5/2005 | Kelly | |
| 6,904,966 B2 | 6/2005 | Philpott | |
| 6,912,864 B2 | 7/2005 | Roche | |
| 6,932,153 B2 | 8/2005 | Ko | |
| 6,942,014 B2 * | 9/2005 | Bonnet | 165/11.1 |
| 6,964,296 B2 | 11/2005 | Memory | |
| 6,988,538 B2 | 1/2006 | Merkys | |
| 7,000,415 B2 | 2/2006 | Daddis | |
| 7,003,971 B2 | 2/2006 | Kester | |
| 7,021,370 B2 | 4/2006 | Papapanu | |
| 7,028,483 B2 | 4/2006 | Mansour | |
| 7,044,200 B2 | 5/2006 | Gupte | |
| 7,066,243 B2 | 6/2006 | Horiuchi | |
| 7,077,193 B2 * | 7/2006 | Kamiyama et al. | 165/174 |
| 7,080,526 B2 | 7/2006 | Papapanu | |
| 7,107,787 B2 | 9/2006 | Inaba | |
| 7,143,605 B2 | 12/2006 | Rohrer | |
| 7,163,052 B2 | 1/2007 | Taras | |
| 7,201,015 B2 | 4/2007 | Feldman | |
| 7,219,511 B2 | 5/2007 | Inaba | |
| 7,222,501 B2 | 5/2007 | Cho | |
| 2002/0124593 A1 | 9/2002 | Yamazaki et al. | |
| 2004/0134226 A1 | 7/2004 | Kraay | |
| 2004/0216863 A1 | 11/2004 | Hu | |
| 2004/0261983 A1 | 12/2004 | Halstead | |
| 2005/0016716 A1 * | 1/2005 | Hu et al. | 165/110 |
| 2005/0056049 A1 | 3/2005 | Sanada | |
| 2005/0061489 A1 * | 3/2005 | Yu et al. | 165/140 |
| 2005/0217831 A1 | 10/2005 | Manaka | |
| 2005/0241816 A1 | 11/2005 | Shabtay et al. | |
| 2005/0269069 A1 | 12/2005 | Hancock | |
| 2006/0102332 A1 | 5/2006 | Taras | |
| 2006/0130517 A1 | 6/2006 | Merkys | |
| 2007/0039724 A1 | 2/2007 | Trumbower | |
| 2007/0044953 A1 * | 3/2007 | Hu | 165/287 |
| 2008/0092587 A1 | 4/2008 | Gorbounov et al. | |
| 2008/0093062 A1 | 4/2008 | Gorbounov et al. | |

FOREIGN PATENT DOCUMENTS

| | | |
|---|---|---|
| EP | 0219974 | 4/1987 |
| EP | 0583851 | 2/1994 |
| EP | 1298401 | 4/2003 |
| EP | 1531309 | 5/2005 |
| JP | 56130595 | 10/1981 |
| JP | 58045495 | 3/1983 |
| JP | 04069228 | 3/1992 |
| JP | 04186070 | 6/1992 |
| JP | 07190661 | 7/1995 |
| JP | 10062092 | 3/1998 |
| JP | 11083371 | 3/1999 |
| JP | 200321432 | 1/2003 |
| JP | 200537054 | 2/2005 |
| WO | WO02/103270 | 12/2002 |
| WO | WO2006/083426 | 8/2006 |
| WO | WO2006/083435 | 8/2006 |
| WO | WO2006/083441 | 8/2006 |
| WO | WO2006/083442 | 8/2006 |
| WO | WO2006/083443 | 8/2006 |
| WO | WO2006/083445 | 8/2006 |
| WO | WO2006/083446 | 8/2006 |
| WO | WO2006/083447 | 8/2006 |
| WO | WO2006/083448 | 8/2006 |
| WO | WO2006/083449 | 8/2006 |
| WO | WO2006/083450 | 8/2006 |
| WO | WO2006/083451 | 8/2006 |
| WO | WO2006/083484 | 8/2006 |

OTHER PUBLICATIONS

U.S. Appl. No. 12/040,559, filed Feb. 29, 2008, Knight et al.
U.S. Appl. No. 12/040,588, filed Feb. 29, 2008, Valiya-Naduvath et al.
U.S. Appl. No. 12/040,661, filed Feb. 29, 2008, Yanik et al.
U.S. Appl. No. 12/040,697, filed Feb. 29, 2008, Yanik et al.
U.S. Appl. No. 12/040,724, filed Feb. 29, 2008, Obosu et al.
U.S. Appl. No. 12/040,743, filed Feb. 29, 2008, Breiding et al.
U.S. Appl. No. 12/040,764, filed Feb. 29, 2008, Knight.

* cited by examiner

MULTICHANNEL HEAT EXCHANGER WITH DISSIMILAR MULTICHANNEL TUBES

CROSS REFERENCE TO RELATED APPLICATIONS

This application claims priority from and the benefit of U.S. Provisional Application Ser. No. 60/867,043, entitled MICROCHANNEL HEAT EXCHANGER APPLICATIONS, filed Nov. 22, 2006, U.S. Provisional Application Ser. No. 60/882,033, entitled MICROCHANNEL HEAT EXCHANGER APPLICATIONS, filed Dec. 27, 2006, and U.S. Provisional Application Ser. No. 60/909,598, entitled MICROCHANNEL COIL HEADER, filed Apr. 2, 2007, which are hereby incorporated by reference.

BACKGROUND

The invention relates generally to multichannel heat exchangers with dissimilar mulitchannel tubes.

Heat exchangers are used in heating, ventilation, air conditioning, and refrigeration (HVAC&R) systems. Multichannel heat exchangers generally include multichannel tubes for flowing refrigerant through the heat exchanger. Each multichannel tube may contain several individual flow channels. Fins may be positioned between the tubes to facilitate heat transfer between refrigerant contained within the tube flow channels and external air passing over the tubes. Multichannel heat exchangers may be used in small tonnage systems, such as residential systems, or in large tonnage systems, such as industrial chiller systems.

In general, heat exchangers transfer heat by circulating a refrigerant through a cycle of evaporation and condensation. In many systems, the refrigerant changes phases while flowing through heat exchangers in which evaporation and condensation occur. For example, the refrigerant may enter an evaporator heat exchanger as a liquid and exit as a vapor. In another example the refrigerant may enter a condenser heat exchanger as a vapor and exit as a liquid. These phase changes may result in both liquid and vapor refrigerant flowing through the heat exchanger flow channels. In particular, one portion of the heat exchanger may contain vapor refrigerant undergoing de-superheating while another portion of the heat exchanger contains a liquid undergoing subcooling.

The phase of the refrigerant may impact the efficiency of the heat exchanger because different phases of refrigerant typically possess different heat transfer properties. For example, vapor phase refrigerant may pass through the flow channels at a higher velocity than liquid phase refrigerant, resulting in less heat transfer occurring for the tubes containing the vapor phase refrigerant. In another example, employing a heat exchanger functioning as a condenser, the vapor refrigerant may need to give off both latent and sensible heat to become a liquid refrigerant while the liquid refrigerant may need to give off only sensible heat to undergo subcooling. In yet another example, the phase of the refrigerant may affect the pressure drop that occurs within the flow channels. In some systems, it may be desirable to minimize the pressure drop by using an increased flow area, thereby improving system efficiency.

SUMMARY

In accordance with aspects of the invention, a heat exchanger and a system including a heat exchanger are presented. The heat exchanger includes a first manifold, a second manifold, a first multichannel tube in fluid communication with the manifolds that includes a plurality of generally parallel flow paths with a first configuration, and a second multichannel tube in fluid communication with the manifolds that includes a plurality of generally parallel flow paths with a second configuration that is different from the first configuration.

In accordance with further aspects of the invention, a method for promoting heat exchange to or from a fluid is presented. The method includes introducing a fluid into an inlet side of a first manifold of a heat exchanger, flowing fluid through a first plurality of multichannel tubes, collecting fluid in a second manifold, and flowing fluid through a second plurality of multichannel tubes to an outlet side of the first manifold. The first plurality of multichannel tubes includes a plurality of generally parallel flow paths with a first configuration, and the second plurality of multichannel tubes includes a plurality of generally parallel flow paths with a second configuration different from the first configuration.

DRAWINGS

Figure 18:
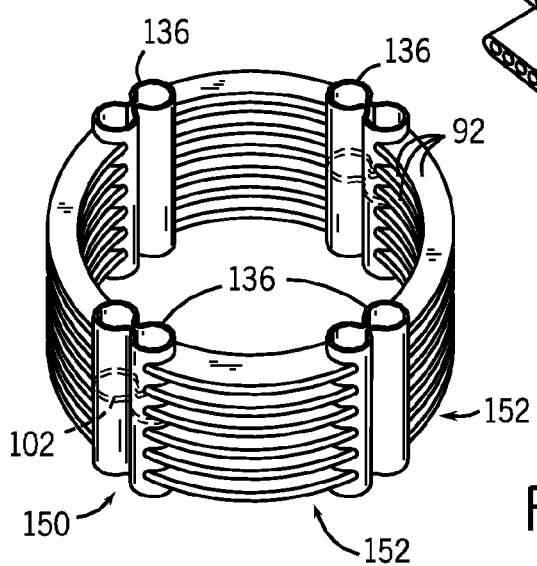

FIG. 18 a perspective view of an exemplary compact heat exchanger in accordance with aspects of the invention.

DETAILED DESCRIPTION

Figure 1:
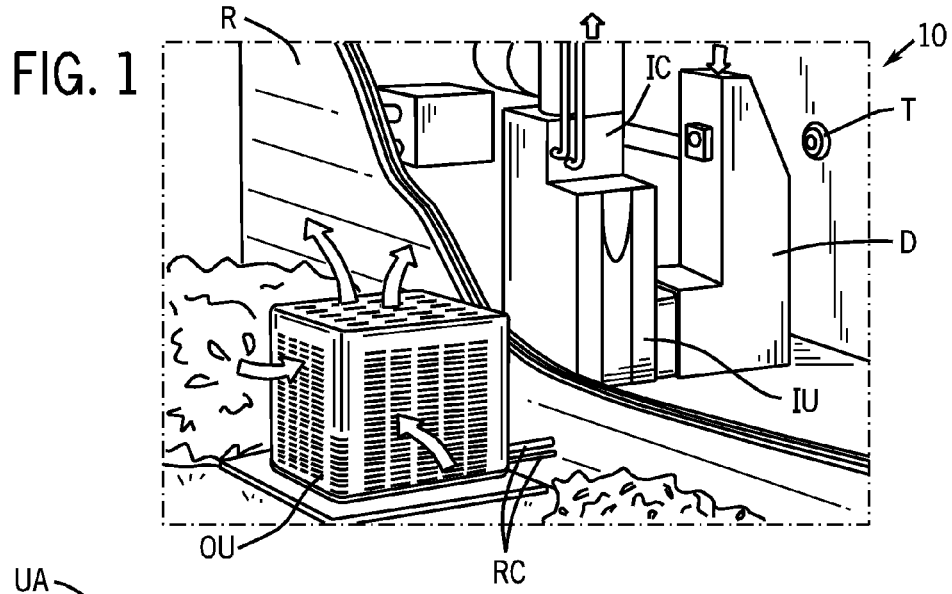
FIG. 1 is a perspective view of an exemplary residential air conditioning or heat pump system of the type that might employ a heat exchanger.
Figure 2:
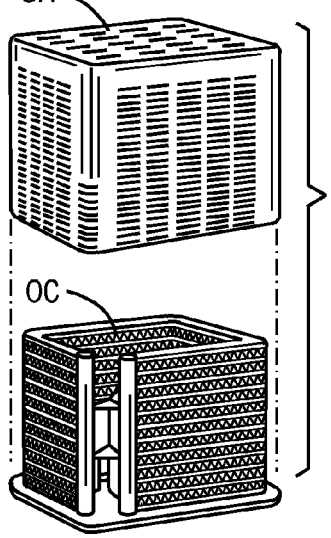
FIG. 2 is a partially exploded view of the outside unit of the system of FIG. 1, with an upper assembly lifted to expose certain of the system components, including a heat exchanger.
Figure 3:
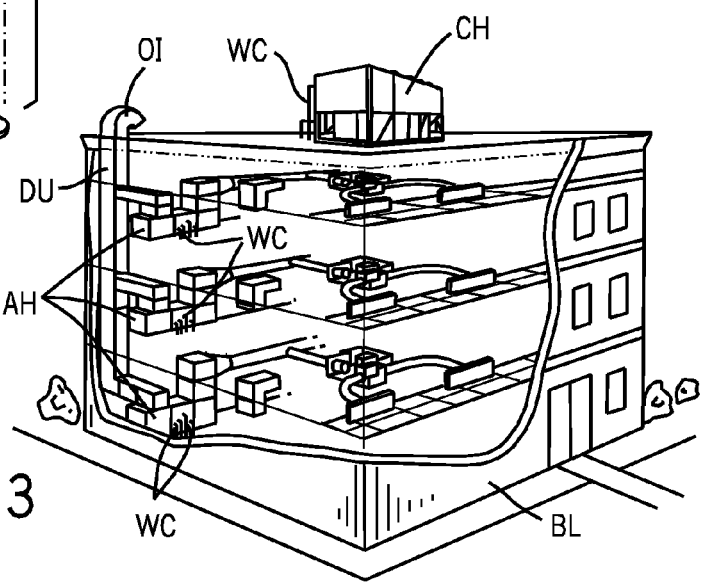
FIG. 3 is a perspective view of an exemplary commercial or industrial HVAC&R system that employs a chiller and air handlers to cool a building and that may also employ heat exchangers.

FIGS. 1-3 depict exemplary applications for heat exchangers. Such systems, in general, may be applied in a range of settings, both within the HVAC&R field and outside of that field. In presently contemplated applications, however, heat exchanges may be used in residential, commercial, light industrial, industrial and in any other application for heating or cooling a volume or enclosure, such as a residence, building, structure, and so forth. Moreover, the heat exchanges may be used in industrial applications, where appropriate, for basic refrigeration and heating of various fluids. FIG. 1 illustrates a residential heating and cooling system. In general, a residence, designated by the letter R, will be equipped with an outdoor unit OU that is operatively coupled to an indoor unit IU. The outdoor unit is typically situated adjacent to a side of the residence and is covered by a shroud to protect the system components and to prevent leaves and other contaminants from entering the unit. The indoor unit may be positioned in a utility room, an attic, a basement, and so forth. The outdoor unit is coupled to the indoor unit by refrigerant conduits RC that transfer primarily liquid refrigerant in one direction and primarily vaporized refrigerant in an opposite direction.

When the system shown in FIG. 1 is operating as an air conditioner, a coil in the outdoor unit serves as a condenser for recondensing vaporized refrigerant flowing from indoor unit IU to outdoor unit OU via one of the refrigerant conduits. In these applications, a coil of the indoor unit, designated by the reference characters IC, serves as an evaporator coil. The evaporator coil receives liquid refrigerant (which may be expanded by an expansion device described below) and evaporates the refrigerant before returning it to the outdoor unit.

The outdoor unit draws in environmental air through sides as indicated by the arrows directed to the sides of unit OU, forces the air through the outer unit coil by a means of a fan (not shown) and expels the air as indicated by the arrows above the outdoor unit. When operating as an air conditioner, the air is heated by the condenser coil within the outdoor unit and exits the top of the unit at a temperature higher than it entered the sides. Air is blown over indoor coil IC, and is then circulated through the residence by means of ductwork D, as indicated by the arrows in FIG. 1. The overall system operates to maintain a desired temperature as set by a thermostat T. When the temperature sensed inside the residence is higher than the set point on the thermostat (plus a small amount), the air conditioner will become operative to refrigerate additional air for circulation through the residence. When the temperature reaches the set point (minus a small amount), the unit will stop the refrigeration cycle temporarily.

When the unit in FIG. 1 operates as a heat pump, the roles of the coils are simply reversed. That is, the coil of the outdoor unit will serve as an evaporator to evaporate refrigerant and thereby cool air entering the outdoor unit as the air passes over the outdoor unit coil. Indoor coil IC will receive a stream of air blown over it and will heat the air by condensing a refrigerant.

FIG. 2 illustrates a partially exploded view of one of the units shown in FIG. 1, in this case outdoor unit OU. In general, the unit may be thought of as including an upper assembly UA made up of a shroud, a fan assembly, a fan drive motor, and so forth. In the illustration of FIG. 2, the fan and fan drive motor are not visible because they are hidden by the surrounding shroud. An outdoor coil OC is housed within this shroud and is generally deposed to surround or at least partially surround other system components, such as a compressor, an expansion device, a control circuit.

FIG. 3 illustrates another exemplary application, in this case an HVAC&R system for building environmental management. A building BL is cooled by a system that includes a chiller CH, which is typically disposed on or near the building, or in an equipment room or basement. Chiller CH is an air-cooled device that implements a refrigeration cycle to cool water. The water is circulated to a building through water conduits WC. The water conduits are routed to air handlers AH at individual floors or sections of the building. The air handlers are also coupled to ductwork DU that is adapted to blow air from an outside intake OI.

Chiller CH, which includes heat exchangers for both evaporating and condensing a refrigerant as described above, cools water that is circulated to the air handlers. Air blown over additional coils that receive the water in the air handlers causes the water to increase in temperature and the circulated air to decrease in temperature. The cooled air is then routed to various locations in the building via additional ductwork. Ultimately, distribution of the air is routed to diffusers that deliver the cooled air to offices, apartments, hallways, and any other interior spaces within the building. In many applications, thermostats or other command devices (not shown in FIG. 3) will serve to control the flow of air through and from the individual air handlers and ductwork to maintain desired temperatures at various locations in the structure.

Figure 4:
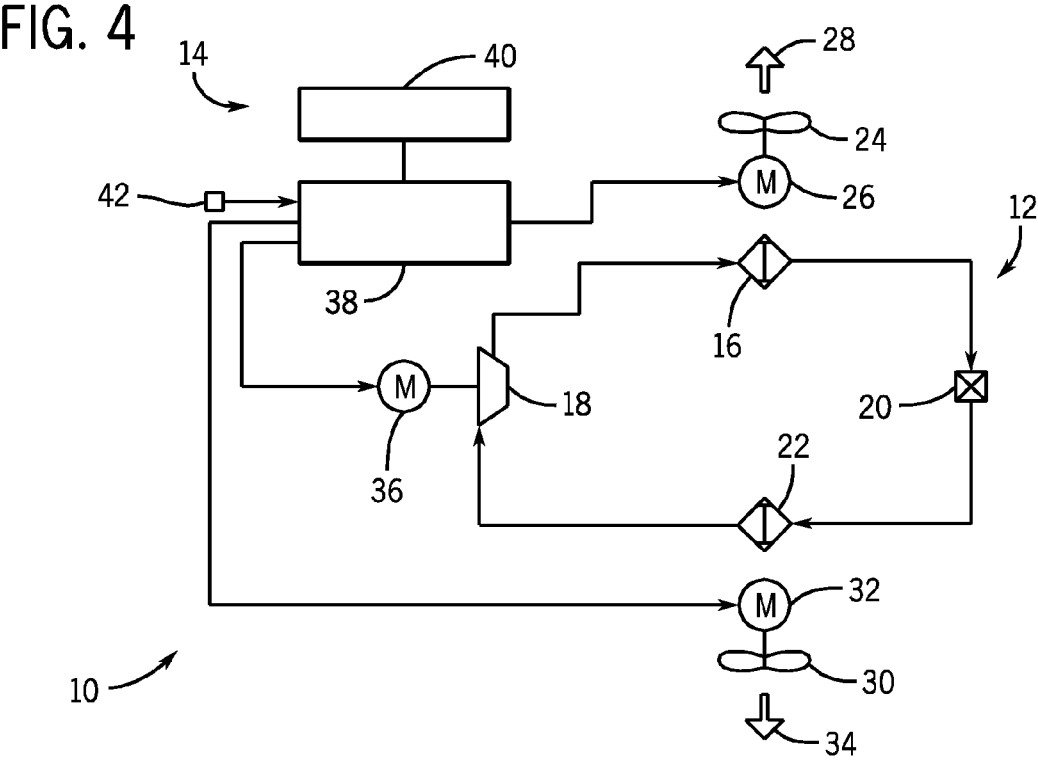
FIG. 4 is a diagrammatical overview of an exemplary air conditioning system which may employ one or more heat exchangers with internal tube configurations.

FIG. 4 illustrates an air conditioning system 10, which uses multichannel tubes. Refrigerant flows through the system within closed refrigeration loop 12. The refrigerant may be any fluid that absorbs and extracts heat. For example, the refrigerant may be hydrofluorocarbon (HFC) based R-410A, R-407, or R-134a, or it may be carbon dioxide (R-744a) or ammonia (R-717). Air conditioning system 10 includes control devices 14 that enable system 10 to cool an environment to a prescribed temperature.

System 10 cools an environment by cycling refrigerant within closed refrigeration loop 12 through condenser 16, compressor 18, expansion device 20, and evaporator 22. The refrigerant enters condenser 16 as a high pressure and temperature vapor and flows through the multichannel tubes of condenser 16. A fan 24, which is driven by a motor 26, draws air across the multichannel tubes. Fan 24 may push or pull air across the tubes. Heat transfers from the refrigerant vapor to the air producing heated air 28 and causing the refrigerant vapor to condense into a liquid. The liquid refrigerant then flows into an expansion device 20 where the refrigerant expands to become a low pressure and temperature liquid. Typically, expansion device 20 will be a thermal expansion valve (TXV); however, in other embodiments, the expansion device may be an orifice or a capillary tube. After the refrigerant exits the expansion device, some vapor refrigerant may be present in addition to the liquid refrigerant.

From expansion device 20, the refrigerant enters evaporator 22 and flows through the evaporator multichannel tubes. A fan 30, which is driven by a motor 32, draws air across the multichannel tubes. Heat transfers from the air to the refrigerant liquid producing cooled air 34 and causing the refrigerant liquid to boil into a vapor. In some embodiments, the fan may be replaced by a pump that draws fluid across the multichannel tubes.

The refrigerant then flows to compressor 18 as a low pressure and temperature vapor. Compressor 18 reduces the volume available for the refrigerant vapor, consequently, increasing the pressure and temperature of the vapor refrigerant. The compressor may be any suitable compressor such as a screw compressor, reciprocating compressor, rotary compressor, swing link compressor, scroll compressor, or turbine compressor. Compressor 18 is driven by a motor 36 that receives power from a variable speed drive (VSD) or a direct AC or DC power source. In one embodiment, motor 36 receives fixed line voltage and frequency from an AC power source although in some applications the motor may be driven by a variable voltage or frequency drive. The motor may be a switched reluctance (SR) motor, an induction motor, an electronically commutated permanent magnet motor (ECM), or any other suitable motor type. The refrigerant exits compressor 18 as a high temperature and pressure vapor that is ready to enter the condenser and begin the refrigeration cycle again.

The operation of the refrigeration cycle is governed by control devices 14 that include control circuitry 38, an input device 40, and a temperature sensor 42. Control circuitry 38 is coupled to motors 26, 32, and 36 that drive condenser fan 24, evaporator fan 30, and compressor 18, respectively. The control circuitry uses information received from input device 40 and sensor 42 to determine when to operate motors 26, 32, and 36 that drive the air conditioning system. In some applications, the input device may be a conventional thermostat. However, the input device is not limited to thermostats, and more generally, any source of a fixed or changing set point may be employed. These may include local or remote command devices, computer systems and processors, mechanical, electrical and electromechanical devices that manually or automatically set a temperature-related signal that the system receives. For example, in a residential air conditioning system, the input device may be a programmable 24-volt thermostat that provides a temperature set point to the control circuitry. Sensor 42 determines the ambient air temperature and provides the temperature to control circuitry 38. Control circuitry 38 then compares the temperature received from the sensor to the temperature set point received from the input device. If the temperature is higher than the set point, control circuitry 38 may turn on motors 26, 32, and 36 to run air conditioning system 10. The control circuitry may execute hardware or software control algorithms to regulate the air conditioning system. In some embodiments, the control circuitry may include an analog to digital (A/D) converter, a microprocessor, a non-volatile memory, and an interface board. Other devices may, of course, be included in the system, such as additional pressure and/or temperature transducers or switches that sense temperatures and pressures of the refrigerant, the heat exchangers, the inlet and outlet air, and so forth.

Figure 5:
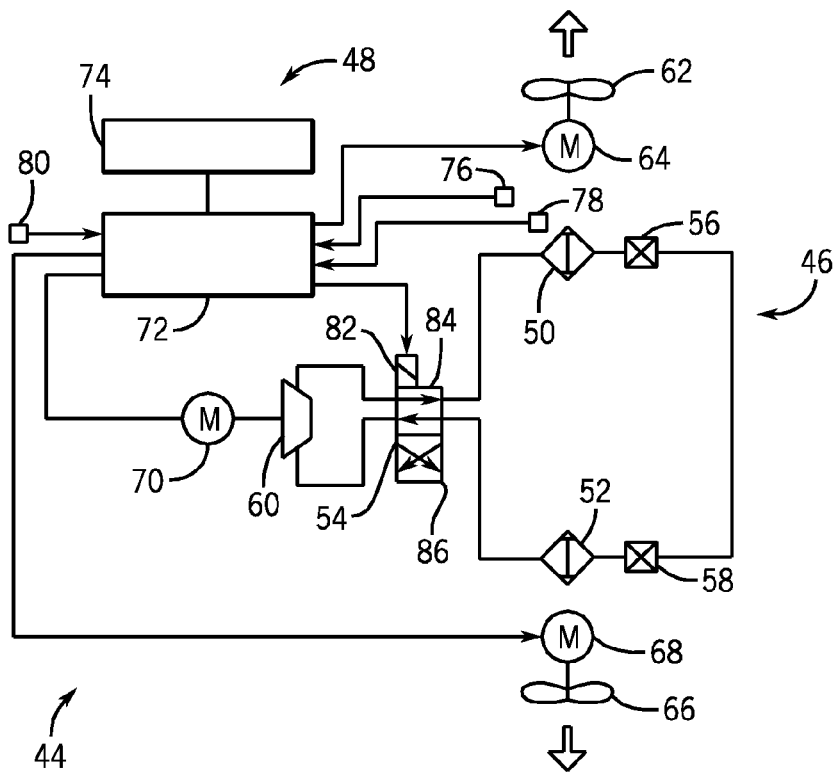
FIG. 5 is a diagrammatical overview of an exemplary heat pump system which may employ one or more heat exchangers with internal tube configurations.

FIG. 5 illustrates a heat pump system 44 that uses multichannel tubes. Because the heat pump may be used for both heating and cooling, refrigerant flows through a reversible refrigeration/heating loop 46. The refrigerant may be any fluid that absorbs and extracts heat. The heating and cooling operations are regulated by control devices 48.

Heat pump system 44 includes an outside coil 50 and an inside coil 52 that both operate as heat exchangers. The coils may function either as an evaporator or as a condenser depending on the heat pump operation mode. For example, when heat pump system 44 is operating in cooling (or "AC") mode, outside coil 50 functions as a condenser, releasing heat to the outside air, while inside coil 52 functions as an evaporator, absorbing heat from the inside air. When heat pump system 44 is operating in heating mode, outside coil 50 functions as an evaporator, absorbing heat from the outside air, while inside coil 52 functions as a condenser, releasing heat to the inside air. A reversing valve 54 is positioned on reversible loop 46 between the coils to control the direction of refrigerant flow and thereby to switch the heat pump between heating mode and cooling mode.

Heat pump system 44 also includes two metering devices 56 and 58 for decreasing the pressure and temperature of the refrigerant before it enters the evaporator. The metering device also acts to regulate refrigerant flow into the evaporator so that the amount of refrigerant entering the evaporator equals the amount of refrigerant exiting the evaporator. The metering device used depends on the heat pump operation mode. For example, when heat pump system 44 is operating in cooling mode, refrigerant bypasses metering device 56 and flows through metering device 58 before entering the inside coil 52, which acts as an evaporator. In another example, when heat pump system 44 is operating in heating mode, refrigerant bypasses metering device 58 and flows through metering device 56 before entering outside coil 50, which acts as an evaporator. In other embodiments, a single metering device may be used for both heating mode and cooling mode. The metering devices typically are thermal expansion valves (TXV), but also may be orifices or capillary tubes.

The refrigerant enters the evaporator, which is outside coil 50 in heating mode and inside coil 52 in cooling mode, as a low temperature and pressure liquid. Some vapor refrigerant also may be present as a result of the expansion process that occurs in metering device 56 or 58. The refrigerant flows through multichannel tubes in the evaporator and absorbs heat from the air changing the refrigerant into a vapor. In cooling mode, the indoor air passing over the multichannel tubes also may be dehumidified. The moisture from the air may condense on the outer surface of the multichannel tubes and consequently be removed from the air.

After exiting the evaporator, the refrigerant passes through reversing valve 54 and into compressor 60. Compressor 60 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From the compressor, the increased temperature and pressure vapor refrigerant flows into a condenser, the location of which is determined by the heat pump mode. In cooling mode, the refrigerant flows into outside coil 50 (acting as a condenser). A fan 62, which is powered by a motor 64, draws air over the multichannel tubes containing refrigerant vapor. In some embodiments, the fan may be replaced by a pump that draws fluid across the multichannel tubes. The heat from the refrigerant is transferred to the outside air causing the refrigerant to condense into a liquid. In heating mode, the refrigerant flows into inside coil 52 (acting as a condenser). A fan 66, which is powered by a motor 68, draws air over the multichannel tubes containing refrigerant vapor. The heat from the refrigerant is transferred to the inside air causing the refrigerant to condense into a liquid.

After exiting the condenser, the refrigerant flows through the metering device (56 in heating mode and 58 in cooling mode) and returns to the evaporator (outside coil 50 in heating mode and inside coil 52 in cooling mode) where the process begins again.

In both heating and cooling modes, a motor 70 drives compressor 60 and circulates refrigerant through reversible refrigeration/heating loop 46. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 70 is controlled by control circuitry 72. Control circuitry 72 receives information from an input device 74 and sensors 76, 78, and 80 and uses the information to control the operation of heat pump system 44 in both cooling mode and heating mode. For example, in cooling mode, input device 74 provides a temperature set point to control circuitry 72. Sensor 80 measures the ambient indoor air temperature and provides it to control circuitry 72. Control circuitry 72 then compares the air temperature to the temperature set point and engages compressor motor 70 and fan motors 64 and 68 to run the cooling system if the air temperature is above the temperature set point. In heating mode, control circuitry 72 compares the air temperature from sensor 80 to the temperature set point from input device 74 and engages motors 64, 68, and 70 to run the heating system if the air temperature is below the temperature set point.

Control circuitry 72 also uses information received from input device 74 to switch heat pump system 44 between heating mode and cooling mode. For example, if input device 74 is set to cooling mode, control circuitry 72 will send a signal to a solenoid 82 to place reversing valve 54 in air conditioning position 84. Consequently, the refrigerant will flow through reversible loop 46 as follows: the refrigerant exits compressor 60, is condensed in outside coil 50, is expanded by metering device 58, and is evaporated by inside coil 52. If the input device is set to heating mode, control circuitry 72 will send a signal to solenoid 82 to place reversing valve 54 in heat pump position 86. Consequently, the refrigerant will flow through the reversible loop 46 as follows: the refrigerant exits compressor 60, is condensed in inside coil 52, is expanded by metering device 56, and is evaporated by outside coil 50.

The control circuitry may execute hardware or software control algorithms to regulate the heat pump system 44. In some embodiments, the control circuitry may include an analog to digital (A/D) converter, a microprocessor, a non-volatile memory, and an interface board.

The control circuitry also may initiate a defrost cycle when the system is operating in heating mode. When the outdoor temperature approaches freezing, moisture in the outside air that is directed over outside coil 50 may condense and freeze on the coil. Sensor 76 measures the outside air temperature, and sensor 78 measures the temperature of outside coil 50. These sensors provide the temperature information to the control circuitry which determines when to initiate a defrost cycle. For example, if either of sensors 76 or 78 provides a temperature below freezing to the control circuitry, system 44 may be placed in defrost mode. In defrost mode, solenoid 82 is actuated to place reversing valve 54 in air conditioning position 84, and motor 64 is shut off to discontinue air flow over the multichannels. System 44 then operates in cooling mode until the increased temperature and pressure refrigerant flowing through outside coil 50 defrosts the coil. Once sensor 78 detects that coil 50 is defrosted, control circuitry 72 returns the reversing valve 54 to heat pump position 86. As will be appreciated by those skilled in the art, the defrost cycle can be set to occur at many different time and temperature combinations.

Figure 6:
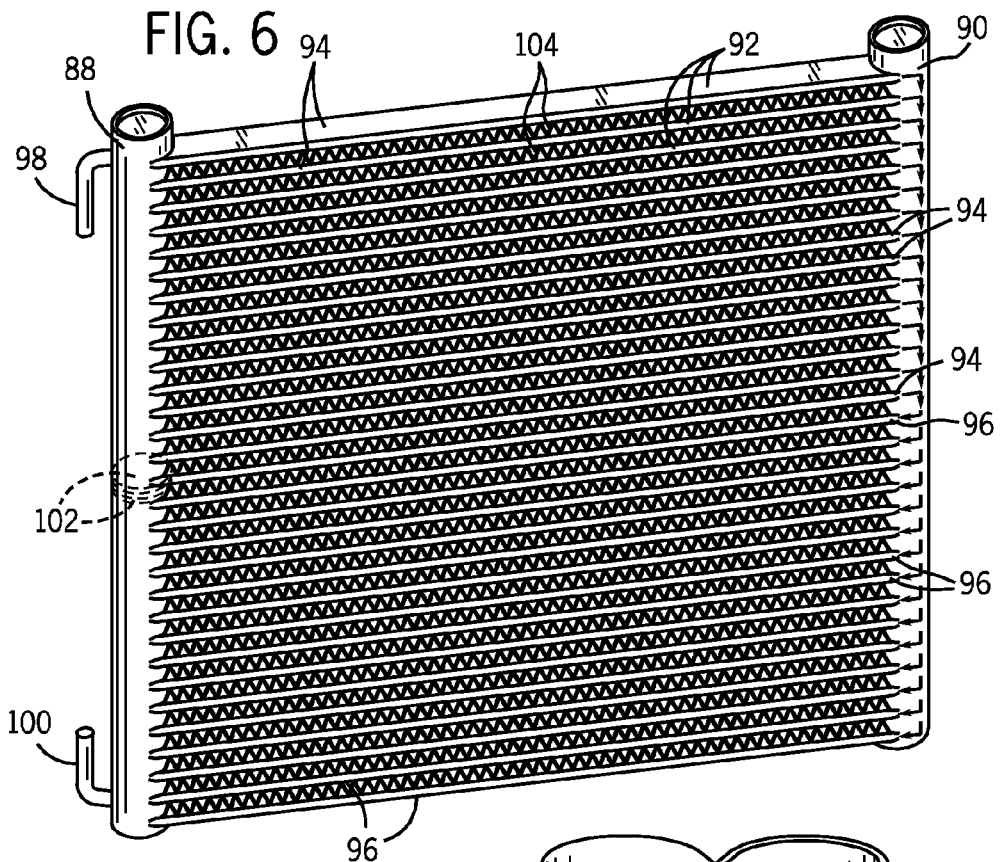
FIG. 6 is a perspective view of an exemplary heat exchanger containing internal tube configurations in accordance with one aspect of the invention.

FIG. 6 is a perspective view of an exemplary heat exchanger, which may be used in an air conditioning system 10 or a heat pump system 44. The exemplary heat exchanger may be a condenser 16, an evaporator 22, an outside coil 50, or an inside coil 52, as shown in FIGS. 1 and 2. It should also be noted that in similar or other systems, the heat exchanger may be used as part of a chiller or in any other heat exchanging application. The heat exchanger includes manifolds 88 and 90 that are connected by multichannel tubes 92. Although 30 tubes are shown in FIG. 6, the number of tubes may vary. The manifolds and tubes may be constructed of aluminum or any other material that promotes good heat transfer. Refrigerant flows from the manifold 88 through first tubes 94 to the manifold 90. The refrigerant then returns to the manifold 88 through second tubes 96. In some embodiments, the heat exchanger may be rotated approximately 90 degrees so that the multichannel tubes run vertically between a top manifold and a bottom manifold. The heat exchanger may be inclined at an angle relative to the vertical. Furthermore, although the multichannel tubes are depicted as having an oblong shape, the tubes may be any shape, such as tubes with a cross-section in the form of a rectangle, square, circle, oval, ellipse, triangle, trapezoid, or parallelogram. In some embodiments, the tubes may have a diameter ranging from 0.5 mm to 3 mm. It should also be noted that the heat exchanger may be provided in a single plane or slab, or may include bends, corners, contours and so forth.

Refrigerant enters the heat exchanger through an inlet 98 and exits the heat exchanger through an outlet 100. Although FIG. 6 depicts the inlet at the top of manifold and the outlet at the bottom of the manifold, the inlet and outlet positions may be interchanged so that the fluid enters at the bottom and exits at the top. The fluid also may enter and exit the manifold from multiple inlets and outlets positioned on bottom, side, or top surfaces of the manifold. Baffles 102 separate the inlet 98 and outlet 100 portions of the manifold 88. Although a double baffle is illustrated, any number of one or more baffles may be employed to create separation of the inlet 98 and the outlet 100.

In a typical heat exchanger application, refrigerant may enter manifold 88 in one phase and exit the manifold 88 in another phase. For example, if the heat exchanger operates as a condenser, refrigerant may enter inlet 98 as a vapor. As the vapor travels through first multichannel tubes 94, the vapor releases heat to the outside environment causing the vapor to desuperheat and condense into a liquid. Then, as the liquid refrigerant travels through second multichannel tubes 96, the liquid releases heat to the outside environment causing subcooling. First tubes 94 may have a different internal configuration than second tubes 96 to maximize the heat transfer properties of the refrigerant when it is in the vapor phase and when it is in the liquid phase.

Fins 104 are located between multichannel tubes 92 to promote the transfer of heat between tubes 92 and the environment. In one embodiment, the fins are constructed of aluminum, brazed or otherwise joined to the tubes, and disposed generally perpendicular to the flow of refrigerant. However, in other embodiments the fins may be made of other materials that facilitate heat transfer and may extend parallel or at varying angles with respect to the flow of the refrigerant. The fins may be louvered fins, corrugated fins, or any other suitable type of fin.

Figure 7:
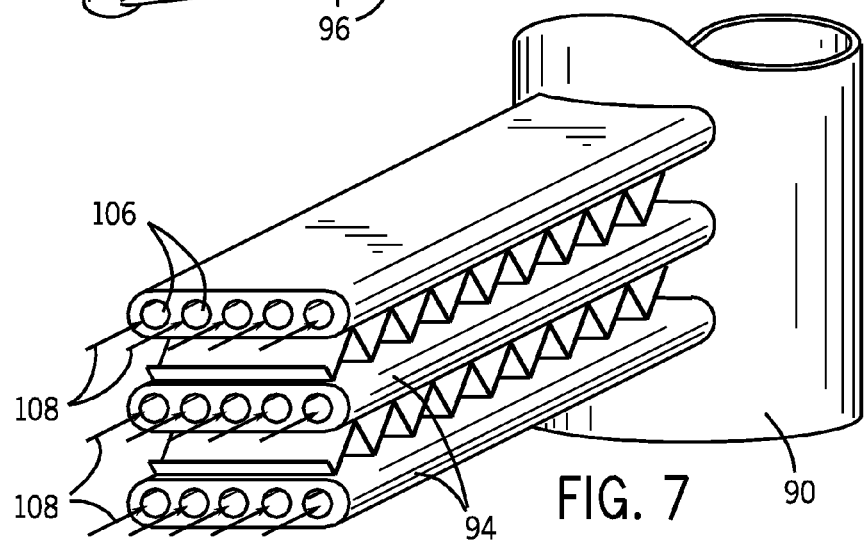
FIG. 7 is a detail perspective view of the heat exchanger of FIG. 6 sectioned through the first tubes.

FIG. 7 shows the heat exchanger of FIG. 6 sectioned through first tubes 94 to illustrate the internal configuration of the first tubes. Refrigerant flows through flow channels 106 formed within the tubes. The direction of fluid flow 108 is from manifold 88 shown in FIG. 6 to manifold 90. As the refrigerant flows toward manifold 90, the refrigerant begins, or continues to, change phases. For example, in a condenser, the vapor refrigerant releases heat to the outside air, is desuperheated, and begins to change from a vapor to a liquid. Likewise, in an evaporator, the liquid refrigerant absorbs heat from the outside air and begins to change from a liquid to a vapor.

Figure 8:
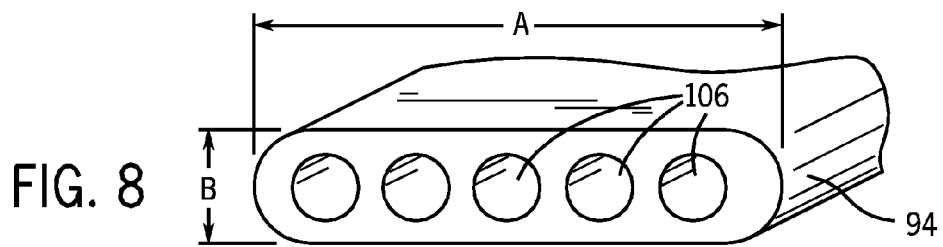
FIG. 8 is a sectional view through one of the first tubes shown in FIG. 7.

FIG. 8 is a sectional view through one of the first tubes 94 shown in FIG. 7. In the illustrated embodiment, flow channels 106 have a round cross-section with a small diameter relative to the width A and height B of the first tubes. In one embodiment, these small diameter flow channels may be used in a condenser configuration to increase the surface area for heat transfer. It should be noted that other flow path shapes may be used, and these may be separated by internal walls that are straight and continuous, or profiles and interruptions may be provided in the walls. Moreover, in a presently contemplated embodiment, the number of parallel flow paths formed in the first tubes may range from 16 to 24, although other numbers may be provided.

Figure 9:
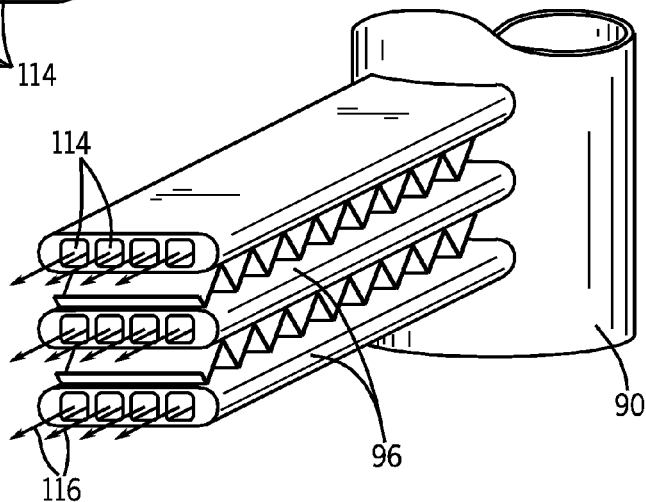
FIG. 9 is a detail perspective view of the heat exchanger of FIG. 6 sectioned through the second tubes.

As illustrated in FIG. 9, the refrigerant returns from manifold 90 through flow channels 114 of the second tubes. The direction of fluid flow 116 is from manifold 90 to manifold 88 shown in FIG. 6. In some embodiments, the refrigerant flowing through the second tubes 96 has already changed phase. For example, in a condenser, the refrigerant may be in the liquid phase (and continues to be subcooled in the second tubes), and in an evaporator, the refrigerant may be in the vapor phase.

Figure 10:
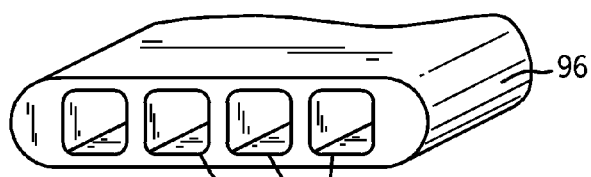
FIG. 10 is a sectional view through one of the second tubes shown in FIG. 9.

FIG. 10 is a sectional view through one of the second tubes 96 shown in FIG. 9. Flow channels 114 have a square cross-section that is larger than the cross-section of flow channels 106, shown in FIG. 8. In one embodiment, these larger diameter flow channels may be used in a condenser configuration to minimize the pressure drop that occurs for the vapor phase refrigerant. It should be noted that the particular shape, size and number of the flow paths in the second tubes may be varied.

Figure 11:
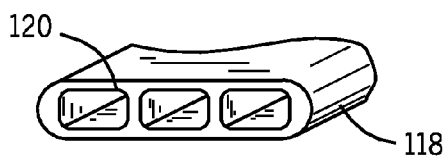
FIG. 11 is a sectional view of a further exemplary multichannel tube.
Figure 12:
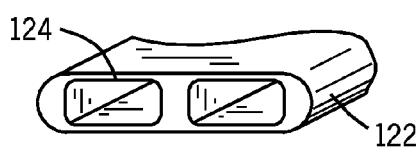
FIG. 12 is a sectional view of another exemplary multichannel tube.
Figure 13:
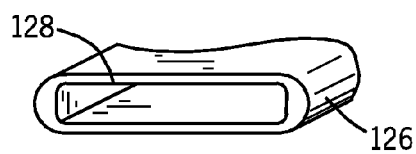
FIG. 13 is a sectional view of still another exemplary multichannel tube.

FIGS. 11, 12, and 13 depict other exemplary cross-sectional shapes that flow channels may have. It should be noted, however, that the shapes shown throughout the figures are not intended to be limiting, and other optimized shapes, sizes, configurations and numbers of flow paths may be provided. FIG. 11 illustrates an alternate tube 118 having flow channels 120 of a rectangular shape. FIG. 12 illustrates an alternate tube 122 having flow channels 124 of a longer rectangular shape. FIG. 13 illustrates an alternate tube 126 with one large flow channel 128. Alternate tube 126 may be used in a tube section of the heat exchanger or additionally, it may be positioned as the bottom tube in a heat exchanger to act as a receiver section for excess refrigerant.

Any combination of internal tube configurations may be used in accordance with the present techniques to optimize performance of the heat exchanger. For example, the first tubes may be configured as depicted in FIG. 11 while the second tubes may be configured as depicted in FIG. 13. Furthermore, the number of flow channels present in the first set of tubes may differ from the number of flow channels present in the second set of tubes. In one embodiment, the internal configuration of the first tubes may be selected based on heat transfer properties for de-superheating vapor phase refrigerant and the internal configuration of the second tubes may be selected based on heat transfer properties for subcooling liquid phase refrigerant.

Moreover, it should be noted that the particular shape and cross-sectional area of the flow channels may be adapted for specific flow and heat transfer goals of the heat exchanger. For example, a greater number of smaller flow channels will generally have a smaller cumulative cross sectional area then a lesser number of larger flow channels. The resulting flow rates (and flow velocities) and consequent thermal transfer rates may be thus altered, and certain flow rates and velocities may be preferred for vapor phase flow, liquid phase flow or mixed phase flow.

Figure 14:
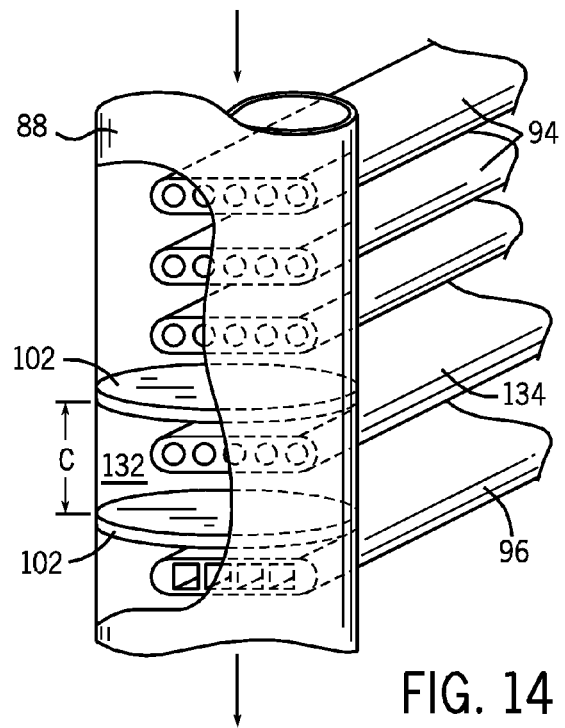
FIG. 14 is a detail perspective view of the heat exchanger of FIG. 6 with a manifold portion cut away.

FIG. 14 illustrates a perspective view of the heat exchanger shown in FIG. 6 with a portion of manifold 88 cut away to show the manifold interior. Note that the fins have been removed for clarity. As shown, the refrigerant exits manifold 88 through first tubes 94 and returns to manifold 88 through second tubes 96. Baffles 102 divide the first tube section of the manifold from the second tube section. The refrigerant in the first tube section of the manifold may be a different phase than the refrigerant in the second tube section. The baffles 102 are spaced apart at a distance C to create a volume 132 within the manifold that provides additional insulation between the two sections of the manifold and to provide redundancy in the event one of the baffles is punctured or otherwise develops a leak. In some embodiments, an isolated tube 134 may be placed in between baffles 102 to provide separation between first tubes 94 and second tubes 96.

Figure 15:
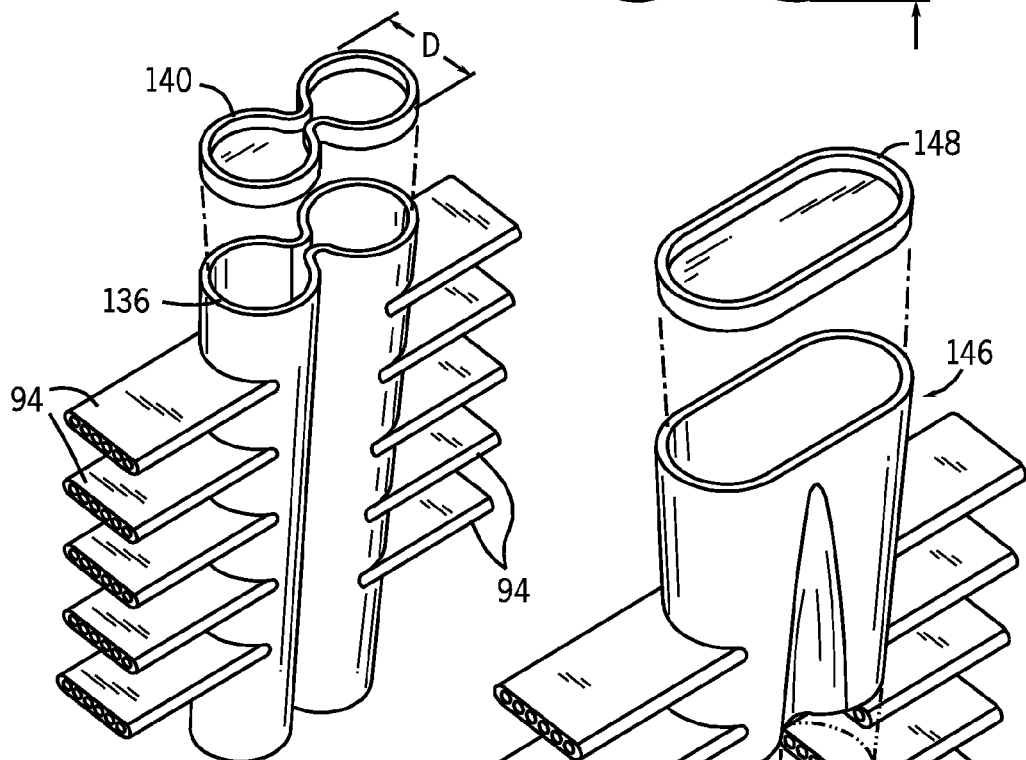
FIG. 15 is a perspective view of an exemplary manifold in accordance with aspects of the invention.

Referring to FIG. 15, other embodiments may include a double manifold 136. Double manifold 136 has a reduced width D which allows for increased capacity in a heat exchanger having width restrictions. Double manifold 140 has a cap 140 which may be placed over an end to contain the refrigerant. In some embodiments, cap 140 may be placed within the manifold to act as a baffle.

Figure 16:
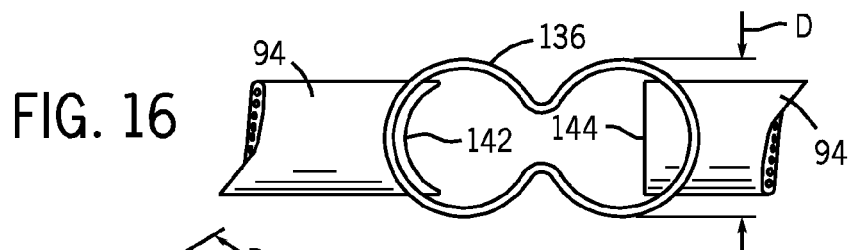
FIG. 16 is a top elevational view of the manifold of FIG. 15.

FIG. 16 is an elevational view of the manifold of FIG. 15 that depicts two end shapes for tubes 94. Tubes 94 may have an end shape 142 that follows the curvature of manifold 136. Alternatively, the tubes may have a traditional flat end shape 144. The tubes used in a heat exchanger may be any combination of the disclosed end shapes. In other embodiments, the end shapes may be used in heat exchangers with single manifolds.

Figure 17:
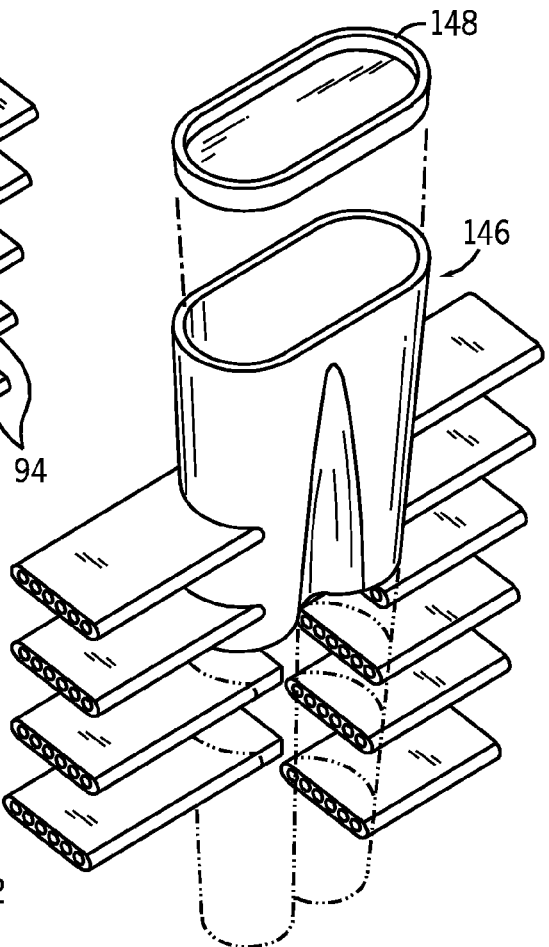
FIG. 17 is a perspective view of another exemplary manifold in accordance with aspects of the invention.

FIG. 17 is a perspective view of an alternative double manifold 146. A cap 148 may be placed over an end to contain the refrigerant. The end shapes of the tubes 94 may be flat or may follow the curvature of the manifold.

In addition to increasing capacity within a small width, double manifolds 136 and 146 may be used to provide support for coils in compact heat exchangers. FIG. 18 is a perspective view of an exemplary compact heat exchanger 150. Note that the fins have been removed for clarity. Double manifolds 136 connect curved coil sections 152 allowing a heat exchanger to be constructed in a circular shape. Baffles 102 may be present within manifolds 136 to separate the refrigerant vapor phase from the refrigerant liquid phase. In other embodiments, double manifolds may be used to construct heat exchangers in other configurations such as rectangular, square, hexagonal, or semi-circular shapes.

The tube configurations described herein may find application in a variety of heat exchangers and HVAC&R systems containing heat exchangers. However, the configurations are particularly well-suited to evaporators used in residential air conditioning and heat pump systems where there is a need to tailor the heat transfer properties for the liquid and vapor refrigerant phases. The configurations are intended to improve heat exchanger efficiency by allowing customization of tubes for the de-superheating process and subcooling process.

It should be noted that the present discussion makes use of the term "multichannel" tubes or "multichannel heat exchanger" to refer to arrangements in which heat transfer tubes include a plurality of flow paths between manifolds that distribute flow to and collect flow from the tubes. A number of other terms may be used in the art for similar arrangements. Such alternative terms might include "microchannel" and "microport." The term "microchannel" sometimes carries the connotation of tubes having fluid passages on the order of a micrometer and less. However, in the present context such terms are not intended to have any particular higher or lower dimensional threshold. Rather, the term "multichannel" used to describe and claim embodiments herein is intended to cover all such sizes. Other terms sometimes used in the art include "parallel flow" and "brazed aluminum." However, all such arrangements and structures are intended to be included within the scope of the term "multichannel." In general, such "multichannel" tubes will include flow paths disposed along the width or in a plane of a generally flat, planar tube, although, again, the invention is not intended to be limited to any particular geometry unless otherwise specified in the appended claims.

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, in an effort to provide a concise description of the exemplary embodiments, all features of an actual implementation may not have been described. It should be appreciated that in the development of any such actual implementation, as in any engineering or design project, numerous implementation specific decisions must be made. Such a development effort might be complex and time consuming, but would nevertheless be a routine undertaking of design, fabrication, and manufacture for those of ordinary skill having the benefit of this disclosure.

The invention claimed is:

1. A heat exchanger comprising:
   a first manifold;
   a second manifold;
   a first multichannel tube in fluid communication with the first manifold and the second manifold and including a plurality of generally parallel flow paths extending therethrough having a first configuration;
   a second multichannel tube in fluid communication with the first manifold and the second manifold and including a plurality of generally parallel flow paths extending therethrough having a second configuration different from the first configuration; and
   a pair of baffles in the first manifold to isolate at least one multichannel tube between the baffles of the pair, wherein the pair of baffles is disposed between the first multichannel tube and the second multichannel tube, and wherein the at least one multichannel tube is isolated within the first manifold only;
   wherein the second manifold is configured to direct a fluid exiting the first multichannel tube directly into both the at least one isolated multichannel tube and the second multichannel tube.

2. The heat exchanger of claim 1, wherein the flow paths of the first multichannel tube are smaller than the flow paths of the second multichannel tube.

3. The heat exchanger of claim 1, wherein the flow paths of the first multichannel tube are of different cross-sectional shape than the flow paths of the second multichannel tube.

4. The heat exchanger of claim 1, wherein the first multichannel tube has more flow paths than the second multichannel tube.

5. The heat exchanger of claim 1, comprising a plurality of the first multichannel tubes in fluid communication with the first manifold and the second manifold, and a plurality of the second multichannel tubes in fluid communication with the first manifold and the second manifold.

6. The heat exchanger of claim 1, wherein the pair of baffles is configured to force inlet flow introduced into the first manifold through the first multichannel tube to the second manifold and to separate the inlet flow from outlet flow exiting from the second multichannel tube.

7. A heat exchanger comprising:
   a first manifold;
   a second manifold;
   a plurality of first multichannel tubes in fluid communication with the first manifold and the second manifold, each first multichannel tube including a plurality of generally parallel flow paths extending therethrough having a first configuration;
   a plurality of second multichannel tubes in fluid communication with the first manifold and the second manifold, each second multichannel tube including a plurality of generally parallel flow paths extending therethrough having a second configuration different from the first configuration;
   a pair of baffles spaced from one another in the first manifold to create a volume therebetween and to divide the first manifold into a first section in fluid communication with the plurality of first multichannel tubes and a second section in fluid communication with the plurality of second multichannel tubes; and
   at least one isolated multichannel tube disposed between the plurality of first multichannel tubes and the plurality of second multichannel tubes and disposed between the baffles of the pair, wherein the at least one isolated multichannel tube is isolated within the first manifold only;
   wherein the second manifold is configured to direct a fluid exiting the plurality of first multichannel tubes directly into both the at least one isolated multichannel tube and the plurality of second multichannel tubes.

8. The heat exchanger of claim 7, wherein the plurality of first multichannel tubes are disposed adjacent to one another and the plurality of second multichannel tubes are disposed adjacent to one another.

9. The heat exchanger of claim 7, wherein the flow paths of the first multichannel tubes are smaller than the flow paths of the second multichannel tubes.

10. The heat exchanger of claim 7, wherein the flow paths of the first multichannel tubes are of different cross-sectional shape than the flow paths of the second multichannel tubes.

11. The heat exchanger of claim 7, wherein the first multichannel tubes have more flow paths than the second multichannel tubes.

12. The heat exchanger of claim 7, wherein the pair of baffles is configured to force inlet flow introduced into the first manifold through the first multichannel tubes to the second manifold and to separate the inlet flow from outlet flow exiting from the second multichannel tubes into the first manifold.

13. The heat exchanger of claim 7, comprising a third manifold disposed in a fluid path between the first and second manifolds, wherein the first multichannel tubes direct flow from the first manifold to the second manifold via the third manifold.

14. A heat exchanger comprising:
   a first manifold;
   a second manifold;
   a plurality of first multichannel tubes in fluid communication with the first manifold and the second manifold, each first multichannel tube including a plurality of generally parallel flow paths extending therethrough having a first configuration;
   a plurality of second multichannel tubes in fluid communication with the first manifold and the second manifold, each second multichannel tube including a plurality of generally parallel flow paths extending therethrough having a second configuration different from the first configuration; and
   a pair of baffles in the first manifold between the plurality of first multichannel tubes and the plurality of second multichannel tubes to direct circulation flow from an inlet side of the first manifold through the plurality of first multichannel tubes to the second manifold and therefrom through the plurality of second multichannel tubes to an exit side of the first manifold, wherein the pair of baffles is configured to isolate at least one multichannel tube between the baffles of the pair, wherein the pair of baffles is disposed between the plurality of first multichannel tubes and the plurality of second multichannel tubes, and wherein the at least one multichannel tube is isolated within the first manifold only;

wherein the second manifold is configured to direct a fluid exiting the plurality of first multichannel tubes directly into both the at least one isolated multichannel tube and the plurality of second multichannel tubes.

15. The heat exchanger of claim 14, wherein the plurality of first multichannel tubes are disposed adjacent to one another and the plurality of second multichannel tubes are disposed adjacent to one another.

16. The heat exchanger of claim 14, wherein the flow paths of the first multichannel tubes are smaller than the flow paths of the second multichannel tubes.

17. The heat exchanger of claim 14, wherein the flow paths of the first multichannel tubes are of different cross-sectional shape than the flow paths of the second multichannel tubes.

18. The heat exchanger of claim 14, wherein the first multichannel tubes have more flow paths than the second multichannel tubes.

19. A method for promoting heat exchange to or from a fluid comprising:
   introducing a fluid into an inlet side of a first manifold of a heat exchanger;
   flowing the fluid through a first plurality of multichannel tubes including a plurality of generally parallel flow paths extending therethrough having a first configuration;
   collecting the fluid in a second manifold; and
   flowing the fluid from the second manifold to an outlet side of the first manifold through a second plurality of multichannel tubes including a plurality of generally parallel flow paths extending therethrough having a second configuration different from the first configuration;
   wherein the first plurality of multichannel tubes are separated from the second plurality of multichannel tubes within the first manifold by a pair of baffles isolating at least one multichannel tube between the baffles of the pair within the first manifold only and wherein the fluid exits the first plurality of multichannel tubes and flows directly into both the at least one isolated multichannel tube and the second plurality of multichannel tubes.

20. A heating, ventilating, air conditioning or refrigeration system comprising:
   a compressor configured to compress a gaseous refrigerant;
   a condenser configured to receive and to condense the compressed refrigerant;
   an expansion device configured to reduce pressure of the condensed refrigerant; and
   an evaporator configured to evaporate the refrigerant prior to returning the refrigerant to the compressor;
   wherein at least one of the condenser and the evaporator includes a heat exchanger having a first manifold, a second manifold, a plurality of first multichannel tubes in fluid communication with the first manifold and the second manifold, each first multichannel tube including a plurality of generally parallel flow paths extending therethrough having a first configuration, a plurality of second multichannel tubes in fluid communication with the first manifold and the second manifold, each second multichannel tube including a plurality of generally parallel flow paths extending therethrough having a second configuration different from the first configuration, and a pair of baffles in the first manifold to isolate at least one multichannel tube between the baffles of the pair, wherein the pair of baffles is disposed between the plurality of first multichannel tubes and the plurality of second multichannel tubes, wherein the at least one multichannel tube is isolated within the first manifold only, and wherein the second manifold is configured to direct a fluid exiting the plurality of first multichannel tubes directly into both the at least one isolated multichannel tube and the plurality of second multichannel tubes.

21. The system of claim 20, wherein the first plurality of multichannel tubes is configured to de-superheat vaporized refrigerant and the second plurality of multichannel tubes is configured to subcool liquid refrigerant.

22. The system of claim 20, further comprising a reversing valve, and wherein the heat exchanger functions as an evaporator in a heat pump mode of operation and as a condenser in an air conditioning mode of operation.

* * * * *